United States Patent [19]

Baker

[11] Patent Number: 4,929,219

[45] Date of Patent: May 29, 1990

[54] BELT LOCATOR FOR LOCATING A BELT ON A PULLEY

[75] Inventor: Gerald N. Baker, St. Louis, Mo.

[73] Assignee: Emerson Electric Co., St. Louis, Mo.

[21] Appl. No.: 367,449

[22] Filed: Jun. 16, 1989

[51] Int. Cl.⁵ ............................................. F16H 7/22
[52] U.S. Cl. .................................. 474/102; 474/107; 474/119
[58] Field of Search ...................... 474/102, 106–108, 474/119–123

[56] References Cited

U.S. PATENT DOCUMENTS 2,655,252 10/1953 Spurgeon ..................... 474/107 X
3,825,125 7/1974 Peterson et al. ............. 474/102 X Primary Examiner—Thuy M. Bui
Attorney, Agent, or Firm—Polster, Polster and Lucchesi

[57] ABSTRACT

A belt driven system (1) employs a dynamoelectric machine (11) to rotate a pulley (7) on which is positioned a drive belt (13). An improvement is a belt locator (19) for locating the belt on the pulley. The locator is effective to properly locate the belt on the pulley if it is initially mis-installed with respect to the pulley, and maintains the belt position if the belt begins to slip off the pulley during operation of the system.

10 Claims, 2 Drawing Sheets

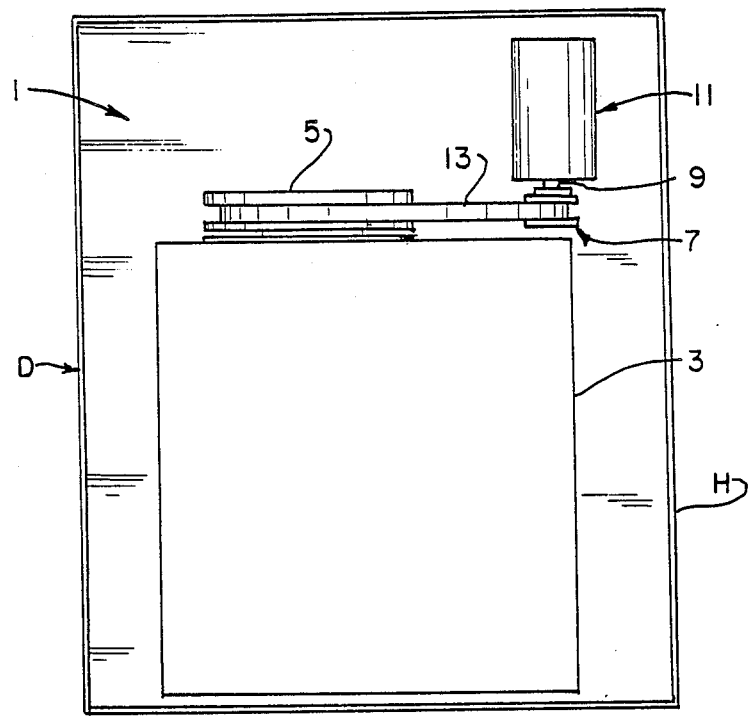
FIG. 1.
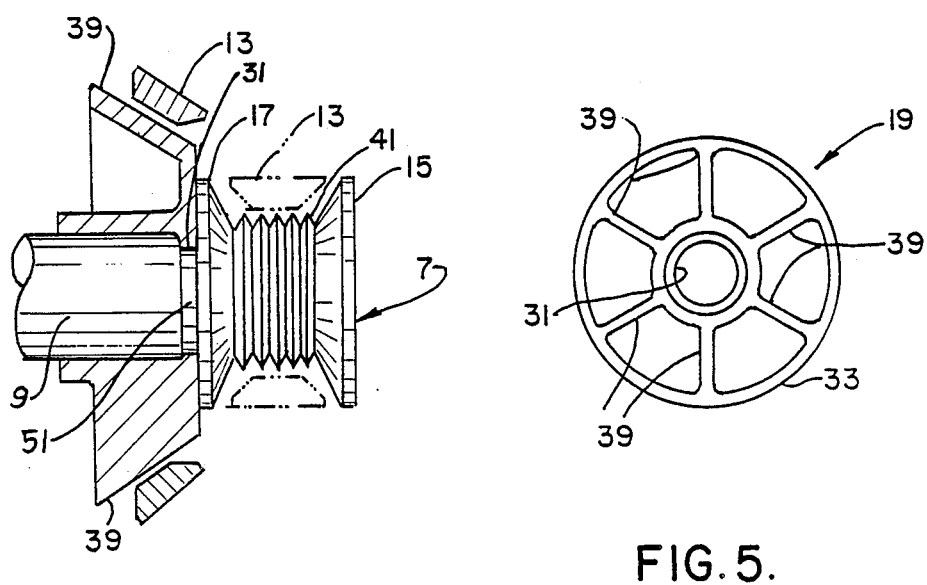
FIG. 4.
FIG. 5.

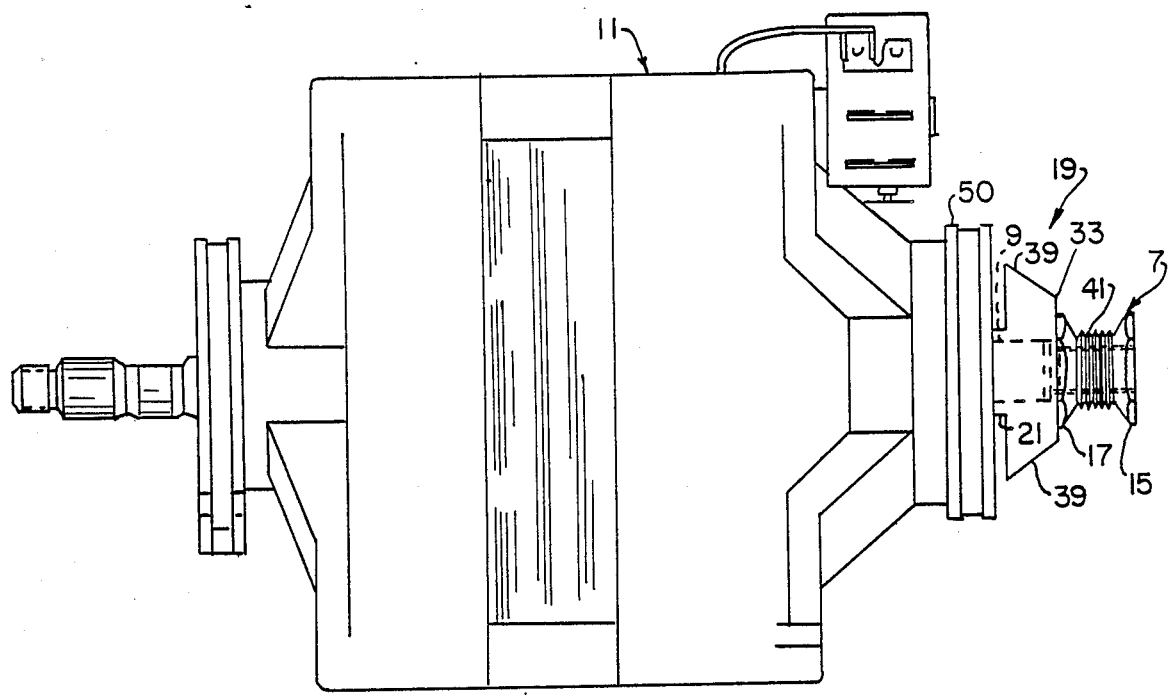
FIG. 2.
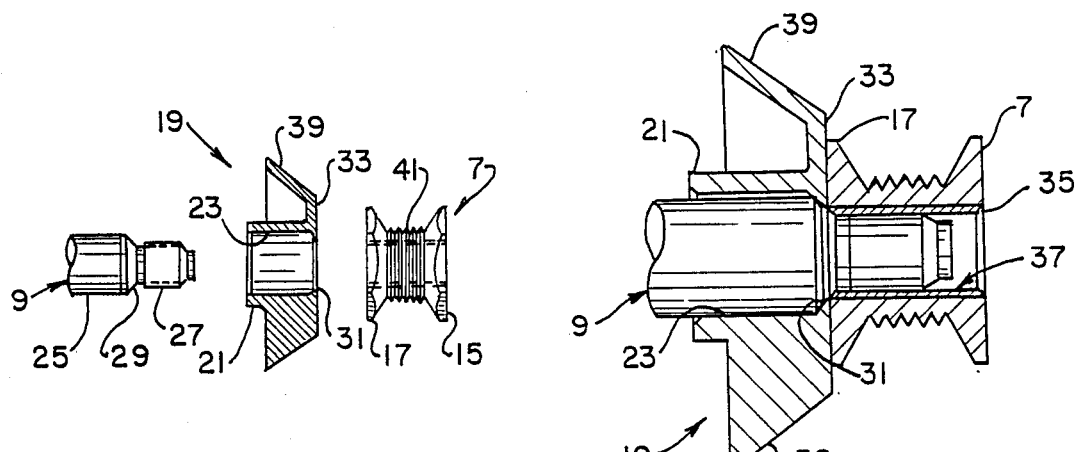
FIG. 3a. FIG. 3b.
FIG. 3.

BELT LOCATOR FOR LOCATING A BELT ON A PULLEY

BACKGROUND OF THE INVENTION

This invention relates to belt driven systems and, more particularly, to a belt locator used in appliances such as electrical dryers to properly position a belt on a pulley and maintain it there. While the invention is disclosed with particular reference to such application, those skilled in the art will recognize the wider applicability of the inventive properties disclosed hereinafter.

In the manufacture of certain electrical appliances such as clothes dryers, the machine assembly operator is required to blindly install a drive belt for the dryer. The dryer conventionally uses a belt and pulley system for turning the clothes drying drum of the appliance. An electric motor used to turn the pulley often is so located in the dryer housing that the assembler cannot see the pulley and hence has to install the belt on it by feel. As a result, the belt may be mistakenly installed on the top edge of the pulley or on a hub ring, or the motor shaft. In these situations, the resulting belt tension is improper, which reduces the life of the belt and necessitates more frequency replacement. Or, the belt may be abraded during operation of the pulley, causing the same result. In addition, even if the belt is correctly installed initially, it may become displaced at some later time; due, for example, to vibration, or to appliance maintenance by field personnel. In such instances, it is advantageous to be able to properly reposition the belt in order to avoid the consequences noted above.

SUMMARY OF THE INVENTION

Among the several objects of the present invention may be noted the provision of a belt locator for use in a belt driven system such as a locator for facilitating proper initial installation of the belt on a motor driven pulley and for maintaining it in its proper position thereafter; the provision of such a locator to be installed on a motor shaft together with the pulley; the provision of such a locator usable on a motor with a stepped shaft; and, a locator which is low in cost and readily installed during assembly of the appliance.

Briefly, a belt driven system employs a dynamoelectric machine to rotate a pulley on which a drive belt is positioned. An improvement comprises a belt locator for locating the belt on the pulley. The locator is effective to locate the belt properly on the pulley when the belt is initially installed, and maintain the belt position if the belt begins to slip off the pulley during operation of the system. Other objects and features will be in part apparent and in part pointed out hereinafter.

BRIEF DESCRIPTION OF THE DRAWINGS

In the drawings, FIG. 1 is a top plan view of an electrical appliance such as a clothes dryer having a belt driven system;

FIG. 2 is an elevational view of an electric motor with a pulley and belt locator installed on a motor shaft;

FIG. 3a is an exploded view, partly in section of the pulley and belt location device of the present invention;

FIG. 3b is a sectional view of the pulley and locator showing their installation on one end of the motor shaft;

FIG. 4 is an illustration of how the locator works to ensure initial and continuing proper installation of a belt on the pulley; and, FIG. 5 is a front elevational view of the locator.

Corresponding reference characters indicate corresponding parts throughout the drawings.

DESCRIPTION OF THE PREFERRED EMBODIMENT

Referring now to the drawings, a belt driven system is indicated generally 1. System 1 is used, for example, in an electrical appliance such as a clothes dryer D. The dryer has a housing H in which is installed a rotatable drum 3. Clothes are placed in the drum which is then turned to facilitate their drying. Drum 3 has a pulley 5 formed at its outer rear end. System 1 includes a pulley 7 mounted on the outer end of a shaft 9 of a dynamoelectric machine or electric motor 11. An endless belt 13 is fitted over both pulleys 5 and 7. Thus, when motor 11 is running, it turns pulley 7 which, in turn, causes rotation of drum 3 via belt 13 turning pulley 5.

As indicated above, drum 3 and motor 11 may be so located within housing H that an assembler of dryer D cannot readily see to install belt 13 on the pulleys 5 and 7. Typically, belt 13 is first located on one of the pulleys 5 or 7, and then fitted over the other. Those skilled in the art will recognize that the some appliance constructions have the belt 13 directly driving the drum 3, without use of a discrete pulley 7. The motor position relative to the drum may then be adjusted to adjust the tension on the belt. Because the belt 13 often has to be blindly installed on pulley 7, it is possible for the assembler to mis-position the belt on the pulley. For example, the belt may be positioned on the outer edge of one of the pulley rims or flanges indicated by the reference numerals 15 or 17. Or, the belt may be not be installed on the pulley at all but on the motor shaft 9 adjacent a motor hub 50. In addition, as the belt wears over time and its tension changes, the belt may work its way off the pulley. That is to say, the motor 11 may move so that proper tension of the belt 13 is not maintained. Any of these circumstances will cause the belt to wear out sooner.

An improvement of the present invention is a belt locator indicated generally 19. The locator comprises a collar 21 having a central, longitudinal bore 23 sized so that the locator may be mounted on motor shaft 9 inward of pulley 7. As shown in FIGS. 2, 3a and 3b, shaft 9 is a stepped shaft having a large diameter inner section 25, a smaller diameter outer section 27, and a transition section 29 between the two. Section 29 may comprise a series of steps by which the reduction in shaft diameter occurs, if desired. The diameter of bore 23 is such that the collar 21 fits over the large diameter section of shaft 9. A lip 31 is formed on the outer face 33 of the collar adjacent the outer end of the bore 23. The inner face of the lip conforms to the configuration of the transition portion of the shaft so when the collar is installed on the shaft, the lip fits over the transition section of the shaft. Alternatively, the shaft 9 may have a slight groove 51 formed in it, the lip 31 engaging the groove 51 during installation of the locator 19. With locator 19 mounted inboard of pulley 7, the length of the pulley, in the embodiment shown, is such that it extends beyond the end of shaft 9 when installed on the shaft. The shaft may extend beyond the pulley in other embodiments. The pulley 7 has a bushing or sleeve 35 about a central bore 37 formed in the pulley. In the alternative, the pulley may be threaded on the shaft 9. The sleeve 35 or the threaded interfit of the pulley, if threads are used, enables the pulley 7 to fit tightly on the end of the shaft.

The pulley, in effect acts as a jam nut against the face 33 to jam the lip 31 against the transition 29 to position the locator 19 properly.

An additional problem is solved by the locator 19. Original equipment manufacturers (OEMs) often offer various performance models of an appliance. Generally, the performance improvement is obtained by utilizing different size motors. Size refers both to physical structure and electrical performance. The locator 19 enables an OEM to replace one motor with another of different size characteristics, because the pulley 7 end of the motor becomes adjustable. That is to say, the interaction between locator 19 and pulley 7 allows for variation to occur without repairing alteration of the drive 3.

The locator includes a plurality of support ribs 39 which extend longitudinally of the collar and are equidistantly spaced about its circumference. While the collar has a uniform inner and outer diameter along its length, the locator 19 has a taper which forms a frusto-conical shape when viewed in cross-section. Each rib 39 begins at forward face 33 of the collar and has an increase or taper in height as it extends back along the length of the collar. While the length of frusto-conical shape of locator 19 is less than the length of collar 21, the shape extends substantially along the length of the collar, as shown in FIGS. 3b and 4. With the upstanding tapered ribs, the diameter of the locator, at its forward end, is greater than the diameter of flange 17. As a result, there is an abrupt transition between the collar 21 and the pulley 7 when they are mounted on the shaft 9.

In operation, with locator 19 installed inboard of pulley 7 on motor shaft 9, mis-alignment of belt 13 is readily overcome. As shown in FIG. 4, belt 13 normally is stretched over a grooved middle portion 41 of pulley 7 and seats between flanges 15 and 17. This is the dashed line position shown in FIG. 4. If the belt is initially installed or positioned along the solid line position shown in FIG. 4, or jumps out of the pulley due to loss of tension because of appliance vibration and consequent belt movement, the rotation of the locator will cause the belt to "walk" down the tapered or downwardly sloping face of ribs 39 until it slips back to its dashed line position. Since there is a discontinuity between the inner edge of flange 17 and the outer diameter of the collar, the belt will not "walk" its way out of the pulley and onto the locator. The "walking" of the pulley is important even during initial construction. For example if the belt, 13 were initially installed improperly, the installation will not obtain the proper belt tension, a fact which is readily apparent during installation. Proper belt positioning than can be obtained without difficulty. Also, the length of the ribs is such that an assembler will not mis-install the belt by inadvertently locating it behind pulley 7 on shaft 9 during assembly of the appliance.

Numerous variations, within the scope of the appended claims, will be apparent to those skilled in the art in view of the foregoing description and accompanying drawings. Thus, while the locator 19 and pulley 7 are shown in two parts, they may be formed integrally, if desired. Material used for the construction of the locator 19 and pulley 7 can be altered. Other design shapes of the locator 19 are compatible with the broader aspects of this invention. These variations are merely illustrative.

Having thus described the invention, what is claimed and desired to be secured by Letters Patent is:

1. In a belt driven system employing a dynamoelectric machine to rotate a pulley on which is positioned a drive belt, the improvement comprising belt locator means for locating the belt on the pulley, the locator means being effective to locate the belt properly on the pulley if the belt is initially mis-installed with respect to the pulley, the dynamoelectric machine including a shaft on which the pulley is mounted, the belt locator means also being mounted on the shaft, the pulley being mounted on the outer end of the motor shaft and the locator means includes a collar mounted on the shaft inboard of the pulley, the collar having a frusto-conical shape and a longitudinal central bore for mounting the collar on the shaft, the shaft being a stepped shaft having a larger diameter section on which the collar fits, a smaller diameter section on which the pulley fits and a transition section therebetween, the collar having a lip formed about an opening adjacent the outer end of the bore and conforming to the shape of the transition section thereby permitting the lip to fit over the transition section.

2. The improvement of claim 1 wherein the pulley and the locator means are mounted on the shaft separately.

3. The improvement of claim 2 wherein the smaller diameter end of the collar abuts the inner end of the pulley.

4. The improvement of claim 3 wherein the pulley has a circumferential flange at its inner end and the diameter of the end of the collar abutting the pulley has a larger diameter than the diameter of the flange.

5. The improvement of claim 2 wherein the collar has a plurality of ribs extending longitudinally of the collar and spaced therearound.

6. In an appliance such as a clothes dryer having a rotatable drum, a dynamoelectric machine such as an electric motor, a pulley driven by the electric motor, and an endless belt mounted on the pulley and attached to the drum for rotating the drum, the improvement comprising belt locator means for locating the belt on the pulley, the locator means being effective to locate the belt properly on the pulley during manufacture of the machine, the motor having a shaft on the outer end of which the pulley is installed and the locator means including a collar mounted on the shaft inward of the pulley, the shaft being a stepped shaft having a larger diameter section on which the collar is mounted, a smaller diameter section on which the pulley is mounted and a transition section therebetween, the collar having a longitudinal central bore the diameter of which corresponds to the diameter of the larger diameter section of the shaft, and the collar having a lip formed about an opening therein adjacent the outer end of the bore, the shape of the lip conforming to the shape of the transition section of the shaft for matingly fitting thereover when the collar is installed on the shaft.

7. The improvement of claim 6 wherein the locator means further includes a plurality of longitudinal ribs spaced about the collar, the ribs beginning at the outer end of the collar and extending substantially along the length thereof.

8. The improvement of claim 7 wherein the ribs taper outwardly in height from the outer end of the collar.

9. The improvement of claim 8 wherein the pulley has circumferential flanges extending radially outwardly at its inner and outer ends and the radius of the collar at its outer end, as measured from the center line of the shaft to the outer tip of a rib is greater than the radius of the pulley as measured from the centerline of the shaft to the perimeter of the flange on the inner end of the pulley.

10. The improvement of claim 6 wherein the locator means and the pulley are mounted separately on the shaft.

* * * * *